US008832947B2

(12) United States Patent
Osawa et al.

(10) Patent No.: US 8,832,947 B2
(45) Date of Patent: *Sep. 16, 2014

(54) TOP-HANDLE WORKING MACHINE

(71) Applicant: Yamabiko Corporation, Tokyo (JP)

(72) Inventors: Hisato Osawa, Tokyo (JP); Kazuhiro Yoneyama, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/892,875

(22) Filed: May 13, 2013

(65) Prior Publication Data

US 2013/0247389 A1 Sep. 26, 2013

Related U.S. Application Data

(62) Division of application No. 12/656,594, filed on Feb. 4, 2010, now Pat. No. 8,707,568.

(30) Foreign Application Priority Data

Feb. 10, 2009 (JP) ................................ 2009-028756

(51) Int. Cl.
*B23D 57/02* (2006.01)
*B25F 5/02* (2006.01)
*B27B 17/00* (2006.01)

(52) U.S. Cl.
CPC ............... *B27B 17/0008* (2013.01); *B25F 5/02* (2013.01)
USPC ................. 30/381; 30/383; 30/340; 16/110.1

(58) Field of Classification Search
CPC ............................ B27B 17/0008; B25G 1/102
USPC ........... 30/381, 340, 210, 517, 216, 276, 383; 16/110.1, 430, 426, 422, 900
See application file for complete search history.

(56) References Cited

U.S. PATENT DOCUMENTS

| | | | | | |
|---|---|---|---|---|---|
| 5,570,512 | A | * | 11/1996 | Hoppner | 30/383 |
| D378,184 | S | * | 2/1997 | Naslund et al. | D8/64 |
| 5,829,099 | A | * | 11/1998 | Kopelman et al. | 16/430 |
| 6,487,779 | B1 | * | 12/2002 | Underthun | 30/277.4 |
| 6,502,314 | B1 | * | 1/2003 | McCatty | 30/340 |
| 7,284,300 | B1 | * | 10/2007 | Bruns | 16/430 |
| 7,694,391 | B2 | * | 4/2010 | Skillas | 16/430 |
| 8,051,538 | B2 | * | 11/2011 | Hsieh | 16/436 |
| 2002/0124353 | A1 | * | 9/2002 | Holland-Letz | 16/430 |
| 2003/0070308 | A1 | * | 4/2003 | Ohsawa et al. | 30/381 |
| 2005/0241111 | A1 | * | 11/2005 | Prokop | 16/430 |

* cited by examiner

*Primary Examiner* — Omar Flores Sanchez
(74) *Attorney, Agent, or Firm* — Dykema Gossett PLLC

(57) ABSTRACT

A top-handle portable working machine includes a grip configuration that makes it easy for a worker to manipulate the implement as intended in order to adapt to tasks in which accuracy, fineness, or an attractive finish is needed. The direction of an axis in which the top grip extends and the direction of a working axis of the implement are inclined relative to each other in a vertical direction so as to intersect at a point to the rear of the housing at angle between 15 and 25°. A detachable grip-position restricting member is attachable to a concave part of the top grip.

4 Claims, 6 Drawing Sheets

(a)

(b)

(a)

(b)

(a)

(b)

TOP-HANDLE WORKING MACHINE

CROSS-REFERENCE TO RELATED APPLICATION

This application is a division of U.S. application Ser. No. 12/656,594, filed Feb. 4, 2010.

BACKGROUND OF THE INVENTION

1. Field of the Invention

The present invention relates to a top-handle portable working machine like as a motor chain saw.

2. Description of the Related Art

In a chain saw or other portable (handheld) working machine, a handle is provided to a housing in which a motor is mounted. A worker grasps the handle to manipulate the machine while holding the housing.

A saw chain or other implement is provided at the front of the housing, and work is performed with the implement facing in front of the worker. In such a portable working machine, the housing must be securely supported by both hands during work, and generally, a handle held by right hand serves as a handle for operating the implement, and a handle held by left hand serves as a handle for supporting the housing.

The operating handle is usually disposed at the top or rear of the housing, along the working axis of the implement. A throttle trigger, engine stop switch, throttle control lockout, and other operating devices are attached to the operating handle. A machine in which the operating handle is provided at the top of the housing is referred to as a top-handle machine, and a machine in which the operating handle is provided at the rear of the housing is referred to as a rear-handle machine. On the other hand, a support handle is usually provided on the side of the housing, and is disposed either toward the front on the side of the housing or so as to traverse the housing at an angle.

Japanese Laid-open Patent Publication No. 2001-205602 discloses a top-handle portable working machine comprising an L-shaped top handle (operating handle) composed of a top grip provided at the top of a housing and a rear connecting part provided to the rear of the housing; and a side handle (support handle) having a front grip that extends substantially horizontally to the side from the vicinity of the front end of the top grip, and an inclined grip that extends downward and to the rear from the end of the front grip, the inclined grip being linear as viewed from the side.

SUMMARY OF THE INVENTION

A top-handle portable working machine such as the conventional example described above can be short from front to rear, and therefore occurs the advantages of light weight and a compact machine body, and handiness. These advantages make such a machine likely to be used in tasks that involve detailed work. Light weight and compactness make a small-sized top-handle chain saw desirable for pruning, branch removal, pruning of fruit trees or other trees, and other tasks in which accuracy, fineness, or an attractive finish is needed.

However, in the conventional top-handle portable working machine, since the direction of the top handle grip is substantially parallel to the axial direction of the implement, the wrist must be bent into an awkward position in order to match the direction of the implement with the forearm direction and move the implement with the intended precision. When the machine is under control, since the grip direction (axial direction of the cylinder created by bending the four fingers other than the thumb) always intersects with the direction of the forearm, when the user tries to perform accurate and detailed work with the direction of the implement coinciding with the forearm direction, the conventional top-handle portable working machine presents a drawback in that the wrist must be bent at an awkward angle, and stress is placed on the forearm muscles, making gripping strength difficult to maintain.

When gripping strength is inadequate during work, the implement may become unsteady, making it impossible to position the implement in the proper work position, and highly precise work or the work intended by the worker may be impossible to perform. The worker's grip on the handle also tends to loosen when work is performed in a state in which adequate gripping strength cannot be obtained. In this case, since the various operating devices are positioned using the assumption of a proper grip on the operating handle, the functions of the operating devices cannot be effectively demonstrated when the handle is not gripped in the proper manner.

When detailed work is performed using a top-handle portable working machine, since the wrist is bent at an awkward angle as described above, the range of motion of the wrist is limited to particular directions, and work that manipulates the movement of the wrist cannot be effectively performed. In tasks such as those described above in which accuracy, fineness, or an attractive finish is needed, the grip state must be made extremely natural and the burden on the wrist and forearm minimized in order for the worker to be able to work comfortably and with creativity.

Even more gripping strength or arm strength is needed in such cases as when the tree or branch to be pruned or otherwise worked has a complex shape or is extremely hard. There is a need for a configuration of grip that enables a reliable hold on the machine body without an unusual amount of effort, and that enables quick movements and the like to be comfortably performed even in such cases as described above.

An object of the present invention is to overcome such problems as those described above. Some specific objects of the present invention are to provide a form of a grip whereby the implement can easily be manipulated as intended by the worker so that work in which accuracy, fineness, or an attractive finish is needed can be performed; to eliminate reduction of gripping strength and make it possible to reduce arm fatigue during work during precise and fine operation of the implement; to appropriately regulate the manner in which the operating handle is held so that the functions of the operating devices can be effectively demonstrated; to make the grip state extremely natural and minimize the burden on the wrist and forearm in order for the worker to be able to work comfortably and with creativity during tasks in which accuracy, fineness, or an attractive finish is needed; and to provide a form of grip that enables a reliable hold on the machine body without an unusual amount of effort, and that enables quick movements and the like to be comfortably performed when the implement is moved in a complex manner, or when working with the implement under a large amount of force in a top-handle portable working machine.

In order to achieve such objects, the top-handle portable working machine of the present invention includes at least the aspect described in the independent claim below.

[Claim 1] A top-handle portable working machine in which an implement is provided to the front of a housing in which a motor is mounted, and a handle having a top grip positioned at the top of the housing is provided to the housing; wherein the direction of an axis in which the top grip extends and the direction of a working axis of the implement are inclined from each other in a vertical direction so as to intersect at a point to the rear of the housing, and the inclination angle θ between the direction of the axis of the top grip and the direction of the working axis of the implement is set in the range of 15 to 25°.

DETAILED DESCRIPTION

Figure 1A:
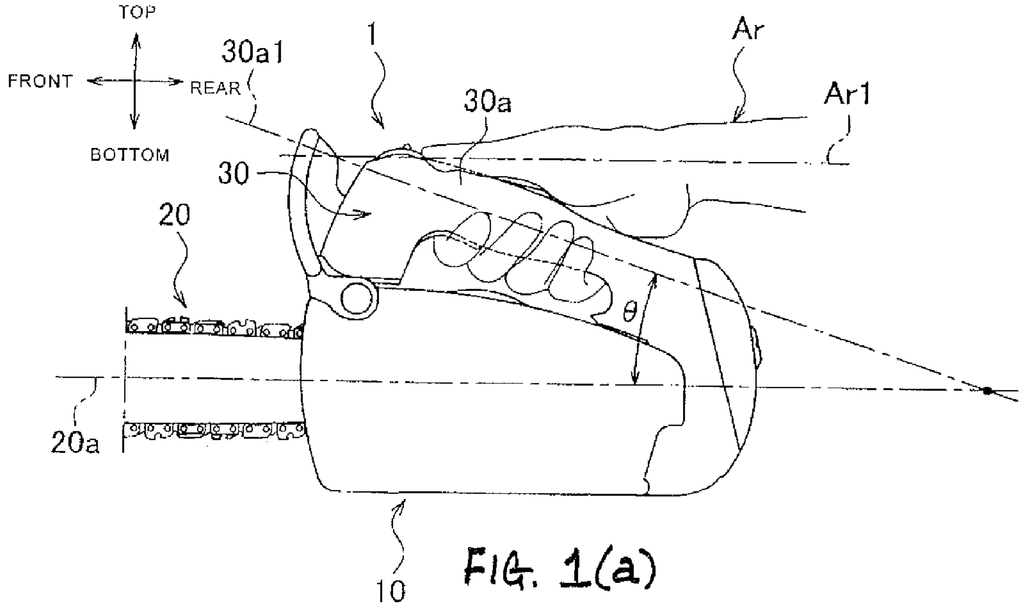
FIG. 1 is a view showing the top-handle portable working machine according to an embodiment of the present invention, wherein FIG. 1(*a*) is a side view showing the overall structure of the top-handle portable working machine according to an embodiment of the present invention, and FIG. 1(*b*) is a side view showing a conventional portable working machine.
Figure 1B:
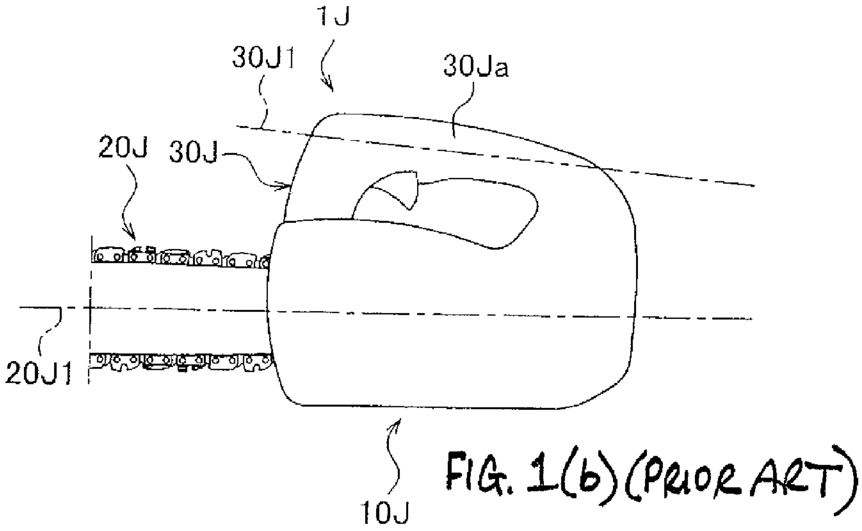
FIG. 1(b) (PRIOR ART)

An embodiment of the present invention will next be described with reference to the drawings. The examples shown in the drawings are encompassed by the embodiment of the present invention, and the present invention is not limited by these examples. FIG. 1 is a view showing the top-handle portable working machine according to an embodiment of the present invention. FIG. 1(*a*) is a side view showing the overall structure of the top-handle portable working machine according to an embodiment of the present invention, and FIG. 1(*b*) is a side view showing the conventional portable working machine. FIG. 1(*a*) shows only one arm schematically in a state of work that is supported by both hands, and does not indicate a state in which work is performed one-handed. The upper arm is not shown in the drawing, but the working position shown is one in which both arms are bent.

The top-handle portable working machine 1 according to an embodiment of the present invention is provided with at least a housing 10 in which a motor is mounted, an implement 20 provided to the front of the housing 10, and a handle 30 having a top grip 30.*a* positioned at the top of the housing 10. The direction of an axis 30*a*1 in which the top grip 30*a* extends and the direction of a working axis 20*a* of the implement 20 are inclined from each other in a vertical direction so as to intersect at a point to the rear of the housing 10, and the inclination angle θ thereof is set in the range of 15 to 25°. In the following description, "front" or "front side" refers to the side of the housing 10 on which the implement 20 is installed (the side facing in front of the worker during work), and "rear" or "rear side" refers to the opposite side (the side facing the worker during work). Moreover, "top" or "top side" refers to the upper part when the working axis 20*a* is placed in the horizontal plane, and "bottom" or "bottom side" refers to the bottom part when the working axis 20*a* is placed in the horizontal plane.

As shown in FIG. 1(*b*), the conventional top-handle portable working machine 1J is usually formed so that the working axis 20J1 of the implement 20J provided to the front of the housing 10J and the axis 30J1 of the top grip 30Ja are substantially parallel. However, in the embodiment of the present invention shown in FIG. 1(*a*), by setting the inclination angle θ to a predetermined angle, gripping strength on the top grip 30*a* can be effectively increased, and the operating properties of the implement 20 can be enhanced.

Specifically, in the embodiment of the present invention, the direction of the axis 30*a*1 of the top grip 30*a* can be inclined the inclination angle θ in relation to the direction Ar1 of the forearm when the worker is working in a state in which the direction of the working axis 20*a* of the implement 20 coincides with (is parallel to) the forearm direction A1 as well. The wrists can therefore be kept in a more natural state than with the conventional portable working machine shown in FIG. 1(*b*), in which the working axis 20J1 and the axis 30J1 of the top grip 30Ja are substantially parallel.

A state in which the forearm direction Ar1 and the direction of the working axis 20*a* coincide is the basic holding form, and the correct direction or position of the implement 20 is thereby easily recognized as the worker moves the implement 20 in the intended manner. The state of the wrist and the burden placed on the forearm Ar is also natural without excessive burden in this basic holding form, but this natural form is necessary in order to increase operability of the implement 20. In the top-handle portable working machine 1 according to an embodiment of the present invention, by setting the aforementioned inclination angle θ to the range of 15 to 25°, the state of the wrist or the burden placed on the forearm. Ar is made natural, and the operability of the implement 20 can be increased in the basic holding form in which the forearm direction Ar1 and the direction of the working axis 20*a* coincide. When the inclination angle θ is greater than 25°, quick motions and the like that manipulate the wrist are difficult to perform, and when the inclination angle θ is less than 15°, the forearm direction Ar1 and the direction of the axis 30*a*1 of the top grip 30*a* are nearly parallel, and adequate gripping strength is no longer obtained. A more preferred range for the inclination angle Stakes into account such factors as the allowable angle of wrist rotation for an adult, and has been shown experimentally to be 17 to 21°.

Figure 2:
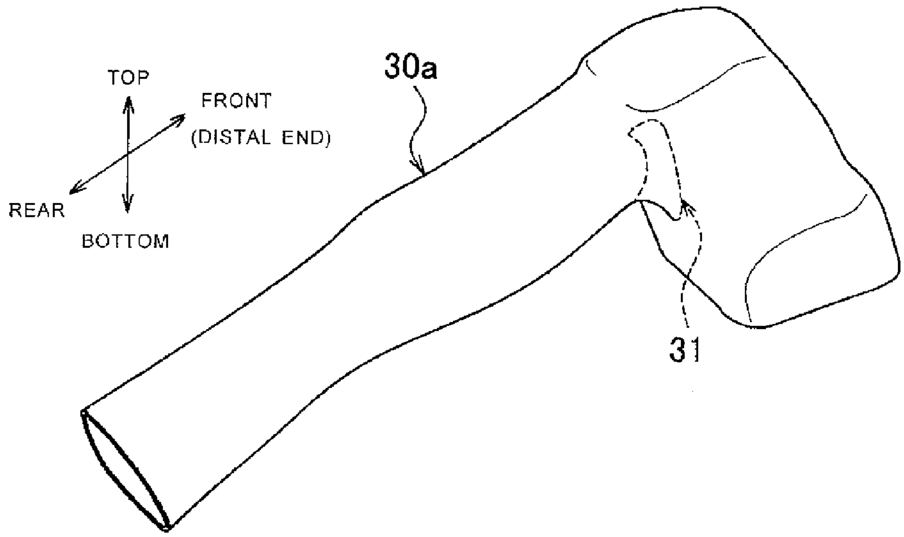
FIG. 2 is a view showing the shape of the top grip in the top-handle portable working machine according to an embodiment of the present invention, wherein of FIG. 2(*a*) and FIG. 2(*b*) are perspective views showing a portion of the top grip.
Figure 2:
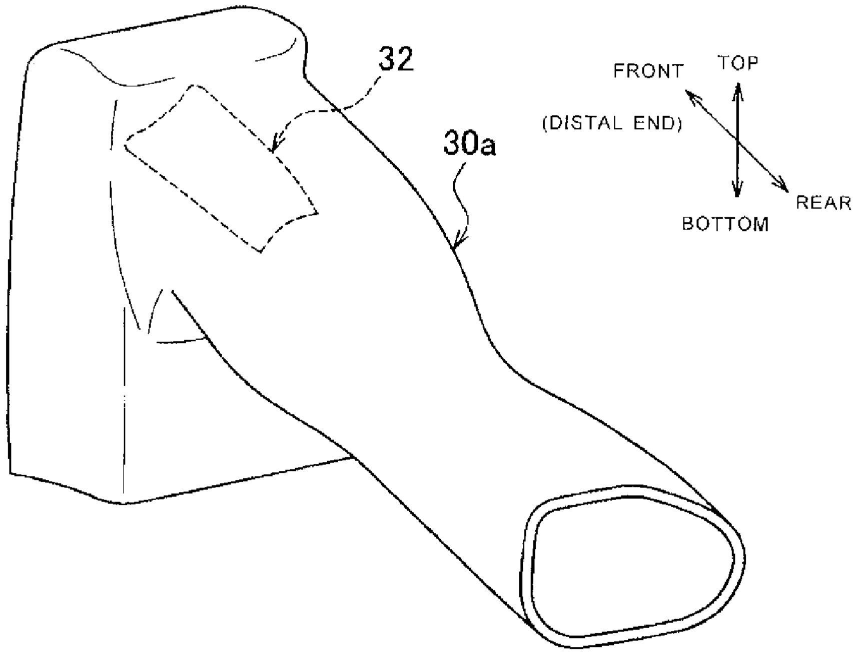
Figure 3:
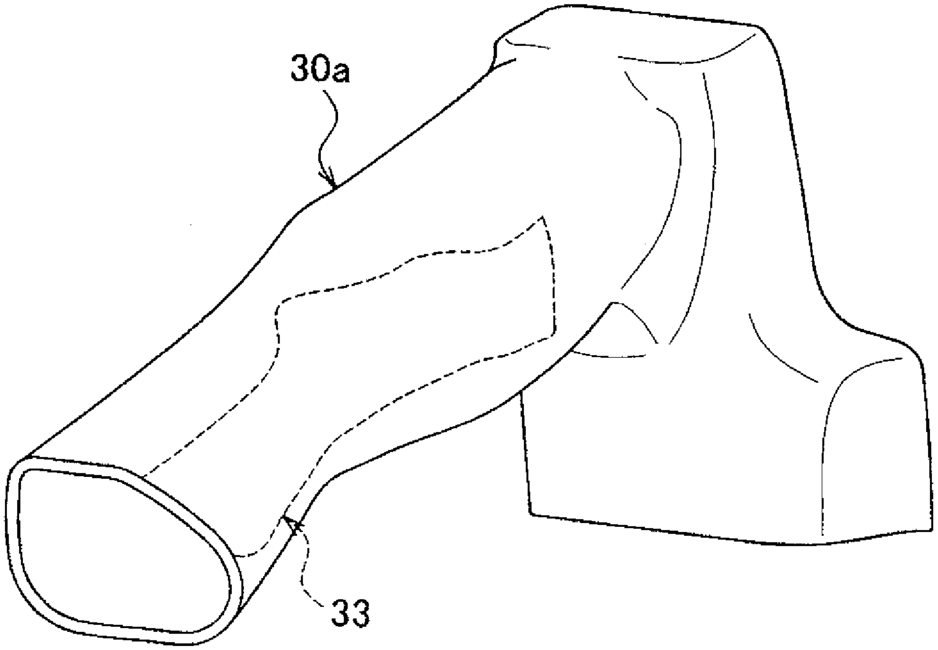
FIG. 3 is a view showing the shape of the top grip in the top-handle portable working machine according to an embodiment of the present invention.
Figure 4:
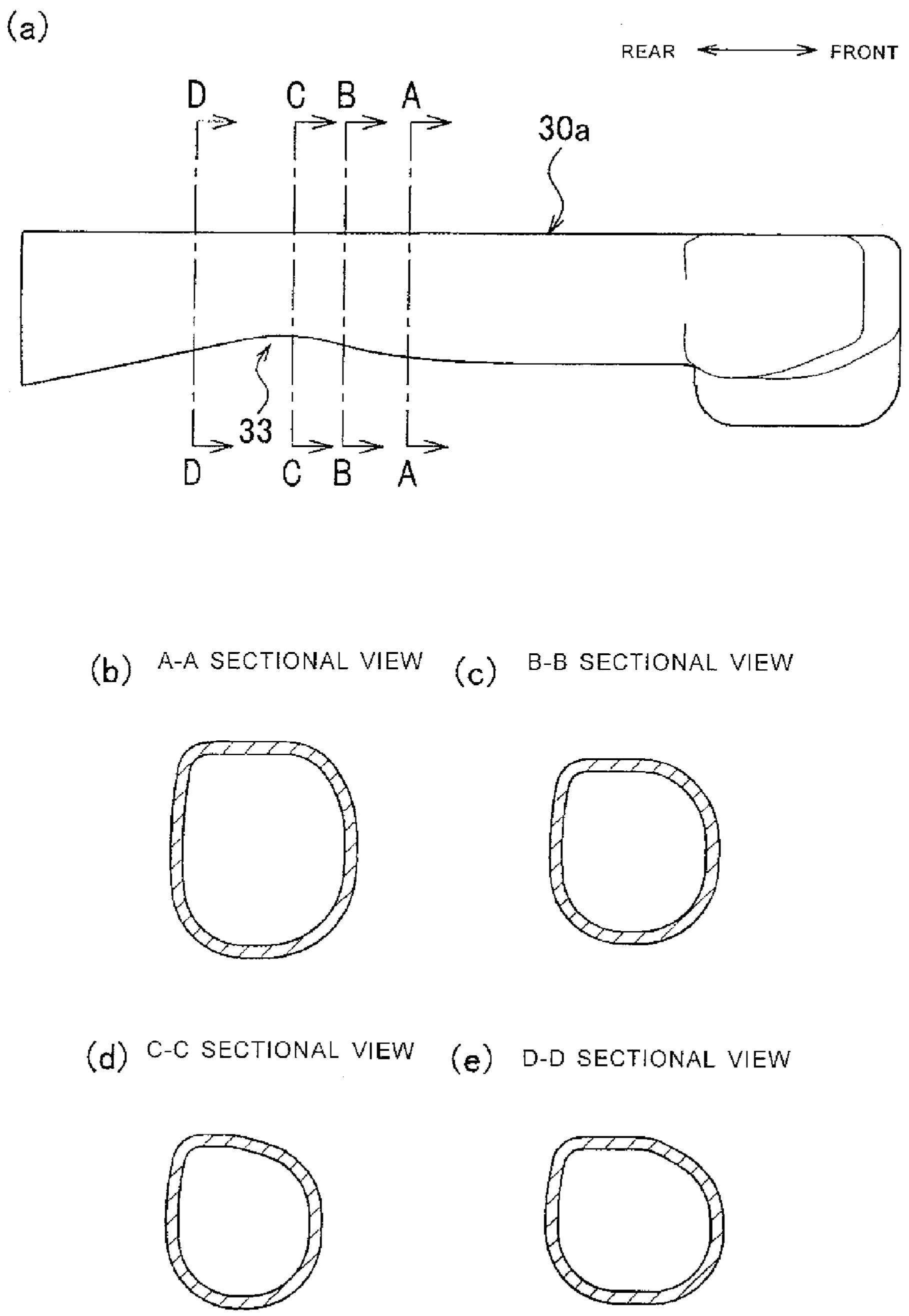
FIG. 4(*a*) is a plan view showing the top grip in the top-handle portable working machine according to an embodiment of the present invention, and FIG. 4(*b*) through FIG. 4(*e*) are sectional views along the section lines shown in FIG. 4(*a*)

FIG. 2 through FIG. 4 are views showing the shape of the top grip in the top-handle portable working machine according to an embodiment of the present invention. FIG. 2(*a*), FIG. 2(*b*), and FIG. 3 are perspective views showing a portion of the top grip, FIG. 4(*a*) is a plan view showing the top grip, and FIG. 4(*b*) through FIG. 4(*e*) are sectional views along the section lines shown in FIG. 4(*a*).

As shown in FIG. 2(*a*), an index-finger support 31 composed of a curved surface that corresponds to the inside of the index finger of the gripping hand when bent in a hook shape is formed in a downward diagonal position from the distal end portion of the top grip 30*a*. As shown in FIG. 2(*b*), a thumb support 32 composed of a flat surface that corresponds to the thick of the thumb of the gripping hand is formed in a position at the opposing corner from the position at which the index-finger support 31 is formed.

Through this characteristic, when the worker grasps the top grip 30*a*, by placing the bended index finger on the index-finger support 31 and placing the thick of the thumb on the thumb support 32, the worker can effectively squeeze the distal end of the top grip 30*a* with the thumb and hooked index finger. The worker can thereby fix the working axis 20*a* of the implement 20 so as to conform to the forearm direction Art, and can properly bring the implement 20 to the desired position of the work object while using adequate gripping strength to prevent unsteadiness of the implement 20.

Furthermore, since the thumb support 32 is formed on the inclined top of the top grip 30*a*, as shown in FIG. 2(*b*), the flat surface of the thumb support 32 receives the pressure of the thumb, and this pressure acts as an operating force when orienting the implement 20 downward. The thumb can thereby be effectively manipulated to move the distal end of the implement 20 downward, and the operability of the implement 20 can be further increased.

The thumb support 32 may also be formed so that the thumb direction and the forearm direction Ar1 coincide when the thumb is placed on the thumb support 32 (see FIG. 1). The worker can thereby bring the implement 20 to a position by pointing the thumb at that position on the work object, and the implement 20 can be accurately brought to bear on the position intended by the worker.

As shown in FIG. 3, a concave part 33 that corresponds to the thick portion of the palm on the little-finger side of the gripping hand is formed on one side surface of the rear portion of the top grip 30*a*. As is apparent from the sectional views shown in FIG. 4, the concave part 33 is formed by a gradually curved surface, and is formed on only one side of the top grip 30*a*. The worker grips the top grip 30*a* with the thick portion of the palm on the little-finger side against the concave part 33, he/she can grip effectively the small-diameter portion of the concave part 33 by the middle, ring, and little finger, and obtain adequate gripping strength.

Grasping so that the thick portion of the palm on the little-finger side is in the concave part 33 also makes it possible to restrict gripping to the appropriate position. Various operating devices not shown in the drawing are usually attached to the top grip 30*a*, and a proper gripping position is assumed in determining the positions of the operating devices. Since providing the concave part 33 keeps the worker's grip in the appropriate position, the functions of the various operating devices that are positioned under the assumption of a proper gripping position can be effectively demonstrated. Furthermore, since there is no loosening of the grip position even during highly precise and detailed work in which the direction of the working axis 20*a* of the implement 20 is brought to coincide with the direction of the forearm Ar, the worker can obtain adequate gripping strength and the operating devices can be demonstrated properly and safely.

FIG. 4 shows a plan view (FIG. 4(*a*)) and sectional views (FIG. 4(*b*) through FIG. 4(*e*)) of the circumferential shape of the concave part 33 of the top grip 30*a*. The concave part 33 is formed on only the right side of the top grip 30*a*, a flat surface is formed on the other side (left side), and the cross-sectional shape of the concave part 33 is left-right asymmetrical. It is therefore uncomfortable to grasp the top grip 30*a* with the left hand (which is the hand opposite the hand the top grip 30*a* is designed to be grasped by), and work is difficult to perform with an improper grip.

In the cross-sectional shape of the right side of the concave part 33, a concave curved surface is gradually formed near the center of the palm (A-A sectional view (FIG. 4(*b*))), a steep depression is formed near the base of the middle finger (B-B sectional view (FIG. 4(*c*))), the depression peaks near the base of the little finger (C-C sectional view (FIG. 4(*d*))), and the depression becomes more shallow toward the rear (D-D sectional view (FIG. 4(*e*))). The area of the palm under the base of the little finger, which thickens during grasping, thereby fits in the concave part 33, and a comfortable grip feeling is obtained when the top grip 30*a* is firmly grasped as well.

Figure 5:
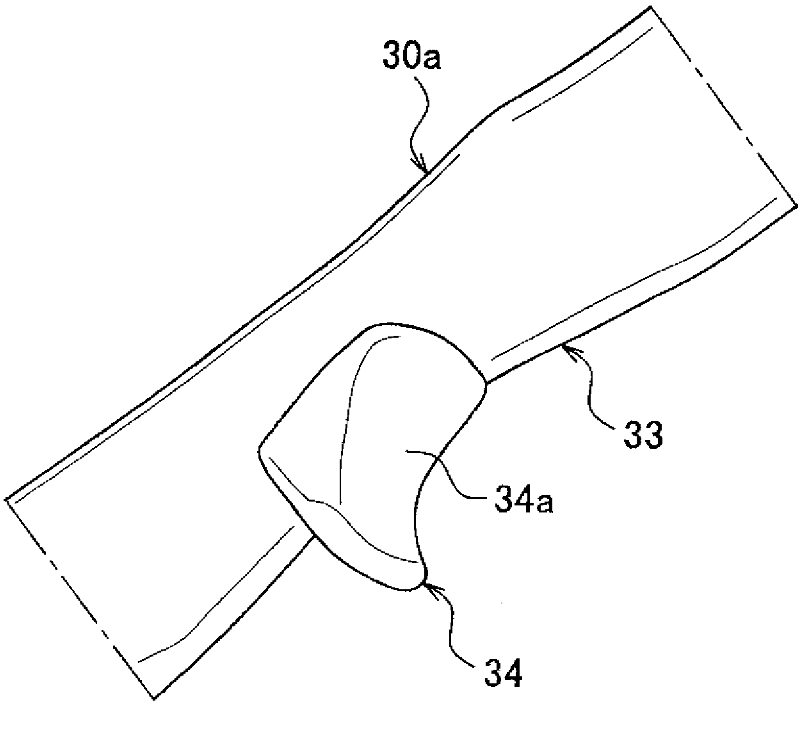
FIG. 5 is a view showing another embodiment of the present invention.

FIG. 5 is a view showing another embodiment of the present invention. In this other embodiment of the present invention, a grip position restricting member 34 for restricting the position of the little-finger side surface of the palm is detachably installed in the concave part 33. The grip position restricting member 34 has a curved surface 34*a* that corresponds to the curved surface of the little-finger side surface of the palm, and by installing the grip position restricting member 34 as an attachment, the grip position can be effectively restricted for a small-handed workers as well. Making the grip position restricting member 34 detachable enables a large-handed worker and a small-handed worker to share the same working machine.

Figure 6:
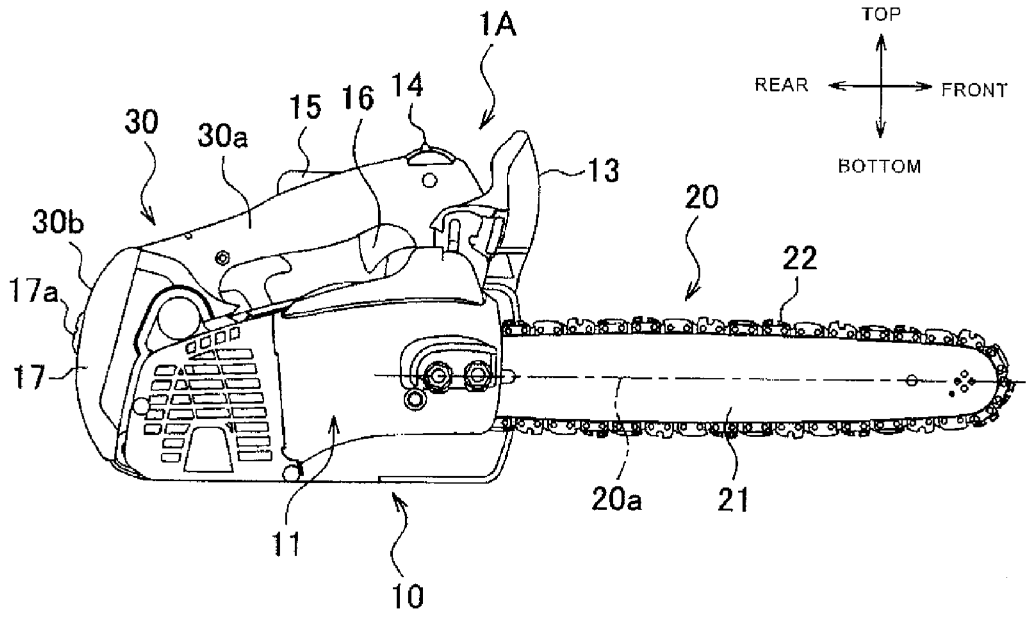
FIG. 6 is a view showing an example (overall structure of a top-handle chain saw) of the top-handle portable working machine according to an embodiment of the present invention, wherein FIG. 6(*a*) is a side view from the right side, and FIG. 6(*b*) is a side view from the left side of only the housing.
Figure 6:
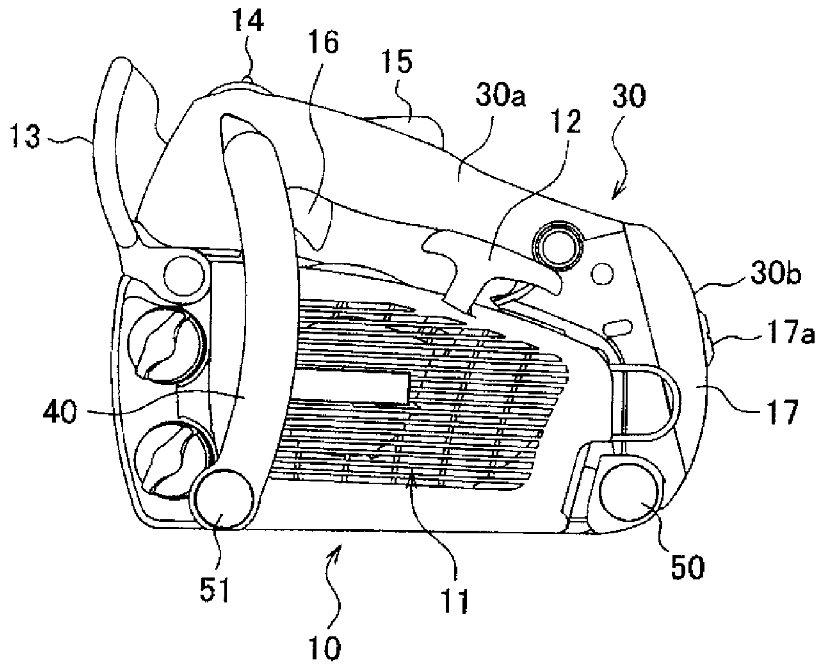

FIG. 6 is a view showing an example (overall structure of a top-handle chain saw) of the top-handle portable working machine according to an embodiment of the present invention (wherein FIG. 6(*a*) is a side view from the right side, and FIG. 6(*b*) is a side view from the left side of only the housing). The chain saw 1A has a synthetic resin housing 10, and a saw chain 22 and a guide bar 21 on which the saw chain 22 is suspended are attached as an implement 20 in a forward-protruding state to the front-right portion of the housing 10.

An engine (e.g., an air-cooled two-cycle gasoline engine) 11 (not shown in detail) as a motor for driving the rotation of the saw chain 22 is mounted in the housing 10, a recoil starter handle 12 for starting the engine 11 is provided toward the rear on the left side of the housing 10 so as to tilt upward and to the rear, and a hand protector guard 13 is provided on the front end of the housing 10. An L-shaped handle (top handle) 30 that is roughly sideways as viewed from the side is provided from the top surface at the front of the housing 10 to the rear end thereof, and an integrally formed side handle 40 is provided on the left side at the front.

The handle 30 is composed of a top grip 30*a* that extends in the front-rear direction along the top surface of the housing 10, and a rear connecting part 30*b* that extends to the rear of the housing 10 from the top grip 30*a*. The lower end of the front end of the top grip 30*a* is connected by a publicly known technique via a vibration dampening member to the top surface of the housing 10, and the lower end of the rear connecting part 30*b* is connected to the lower end of the rear end of the housing 10 by a connecting means 50.

An engine stop switch 14, a throttle control lockout 15, and a throttle trigger 16 are provided to the top grip 30*a* of the handle 30. An air cleaner cover 17 having a detachment button 17*a* is detachably attached to the rear surface of the rear connecting part 30*b*.

The top end of the side handle 40 is connected to the left side surface of the handle 30, and the lower end of the side handle 40 is connected via connecting means 51 at a position in the lower part of the left side surface at the front of the housing 10. The configuration of the side handle 40 is not limited to the configuration described above, and the side handle 40 may be formed in an L shape with the lower end connected to the left side surface at the rear of the housing 10, or the lower end may be connected to the left side surface at the rear of the housing 10 so as to traverse the left side surface of the housing 10 at an angle.

In the chain saw 1A thus configured, through the use of the characteristic top grip 30*a*, the working axis 20*a* of the implement 20 can be made to conform to the forearm direction Ar1, and highly precise and detailed work is facilitated.

Specifically, through the chain saw 1A according to the embodiment of the present invention, by a grip configuration the worker can be easy to manipulate the implement 20 as intended in order to adapt to pruning, branch removal, pruning of fruit trees or other trees, and other tasks in which accuracy, fineness, or an attractive finish is needed. Setting the inclination angle θ of the top grip 30*a* to 15 to 25° and providing the index-finger support 31 and thumb support 32 make it possible to eliminate reduction of gripping strength and reduce arm fatigue during work during precise and fine operation of the implement 20. Furthermore, the gripping form can be made extremely natural, and the burden on the wrist and forearm can be minimized in order for the worker to be able to work comfortably and with creativity during tasks in which accuracy, fineness, or an attractive finish is needed. The machine body can also be reliably held, and quick movements and the like can be comfortably performed without an unusually large amount of effort even if the work required forceful and/or complex work.

Furthermore, since the concave part 33 provided to the top grip 30*a* enables the feel of the grip to be enhanced when the top grip 30*a* is grasped, and the grip position can be properly placed, the engine stop switch 14, throttle control lockout 15, and throttle trigger 16 that are manipulated while the top grip 30*a* is grasped can be properly manipulated with the index finger and thumb, and the inherent utility and safety of the chain saw 1A can be adequately demonstrated.

When a large-handed worker and a small-handed worker share a single working machine, installing the grip position restricting member 34 in the concave part 33 of the top grip 30*a* makes it possible to set the grip position to the proper position as previously described, even for the small-handed worker. The inherent utility and safety of the chain saw 1A can thereby be adequately demonstrated regardless of hand size.

Embodiments of the present invention were described above in detail with reference to the drawings, but the specific configuration of the present invention is not limited by these embodiments, and design and other modifications that do not depart from the intended scope of the present invention are encompassed by the present invention.

What is claimed is:

1. A top-handle portable working machine in which an implement is provided to the front of a housing in which a motor is mounted, and a handle having a top grip positioned at the top of the housing is provided to the housing; wherein the direction of an axis in which the top grip extends and the direction of a working axis of the implement are inclined from each other in a vertical direction so as to intersect at a point to the rear of the housing, and the inclination angle Θ between the direction of the axis of the top grip and the direction of the working axis of the implement is set in the range of 15 to 25°, and wherein an index-finger support comprising a curved surface that corresponds to the inside of the index finger of the gripping hand when bent in a hook shape is formed in a downward diagonal position from a distal end portion of the top grip, a thumb support comprising a flat surface that corresponds to the thick of the thumb of the gripping hand is formed in a position at the opposing corner from the downward diagonal position from the distal end portion in the top grip, wherein a concave part that corresponds to the thick portion of the palm on the little-finger side of the gripping hand is formed on one side surface of the rear portion of the top grip, and wherein a grip-position restricting member for restricting the position of the little surface of the palm is detachably installed in the concave part.

2. The top-handle portable working machine of claim 1, wherein the implement comprises a saw chain driven by the motor, and a side handle integrated with the handle is provided to a side of the housing.

3. The top-handle portable working machine of claim 1, wherein the implement comprises a saw chain driven by the motor, and a side handle integrated with the handle is provided to a side of the housing.

4. The top-handle portable working machine of claim 1, wherein said concave part and said flat surface are located at a junction of the top grip and a front support pillar connected to the front of the housing.

* * * * *